US012447049B1

(12) United States Patent
Chen et al.

(10) Patent No.: US 12,447,049 B1
(45) Date of Patent: Oct. 21, 2025

(54) ASSEMBLED PROTECTIVE GOGGLES WITH LIGHT

(71) Applicant: STARFORCE INCORPORATED, Taichung (TW)

(72) Inventors: Dung-Fu Chen, Taichung (TW); Robert R. Finnigan, Renton, WA (US)

(73) Assignee: STARFORCE INCORPORATED, Taichung (TW)

( * ) Notice: Subject to any disclaimer, the term of this patent is extended or adjusted under 35 U.S.C. 154(b) by 0 days.

(21) Appl. No.: 18/744,730

(22) Filed: Jun. 17, 2024

(51) Int. Cl.
*A61F 9/02* (2006.01)

(52) U.S. Cl.
CPC .............. *A61F 9/029* (2013.01); *A61F 9/02* (2013.01)

(58) Field of Classification Search
CPC .................................. A61F 9/029; A61F 9/02
See application file for complete search history.

(56) References Cited

U.S. PATENT DOCUMENTS

| 3,896,496 | A | * | 7/1975 | Leblanc | A61F 9/025 2/443 |
| 5,093,940 | A | * | 3/1992 | Nishiyama | G02C 11/00 2/440 |
| 5,189,447 | A | * | 2/1993 | Oleson | G02C 5/146 2/448 |
| 5,412,438 | A | * | 5/1995 | Bolle' | G02C 5/126 351/44 |
| 5,428,407 | A | * | 6/1995 | Sheffield | G02C 9/00 351/158 |
| 5,682,621 | A | * | 11/1997 | Park | A61F 9/026 2/443 |
| 5,796,461 | A | * | 8/1998 | Stepan | G02C 5/20 351/86 |
| 6,386,703 | B1 | * | 5/2002 | Huang | G02C 9/00 351/57 |
| 6,502,937 | B2 | * | 1/2003 | Yang | G02C 9/00 351/57 |
| 6,641,263 | B2 | * | 11/2003 | Olney | A61F 9/026 351/158 |
| 6,749,299 | B1 | * | 6/2004 | Hsu | G02C 11/00 2/435 |
| 6,848,786 | B1 | * | 2/2005 | Teng | G02C 1/06 351/86 |
| 6,938,277 | B2 | * | 9/2005 | Lindahl | A61F 9/029 351/158 |
| 7,062,798 | B2 | * | 6/2006 | Wu | A61F 9/026 2/448 |

(Continued)

*Primary Examiner* — Khaled Annis
(74) *Attorney, Agent, or Firm* — WPAT, PC

(57) ABSTRACT

Assembled protective goggles with light include a primary frame, defining a primary inner side and a primary outer side that are reverse to each other, wherein the primary inner side is provided with two nose pads; two lenses, being installed at the side of the primary frame that has the two nose pads; two connecting members, being pivotally connected to two ends of the primary frame, respectively; a lighting unit, having a power source and a light source that are coupled to each other, wherein the power source is installed on one of the connecting members to power the light source, and the light source is installed on the primary outer side of the primary frame along a top edge of the primary frame; a wearable member, being connected to the two connecting members; and a secondary frame, being detachably connected to the primary frame.

13 Claims, 11 Drawing Sheets

(56) References Cited

U.S. PATENT DOCUMENTS

| | | | | |
|---|---|---|---|---|
| 7,172,281 | B2* | 2/2007 | Chen | G02C 11/08 351/158 |
| 8,297,749 | B2* | 10/2012 | Chen | G02C 9/00 351/44 |
| 8,307,466 | B2* | 11/2012 | Hsu | A61F 9/026 2/428 |
| 11,163,155 | B1* | 11/2021 | Castañeda | G06F 1/3231 |
| 2002/0152543 | A1* | 10/2002 | Chou | A63B 33/00 2/428 |
| 2002/0157174 | A1* | 10/2002 | Chou | A63B 33/004 2/428 |
| 2004/0066486 | A1* | 4/2004 | Yi | G02C 1/04 351/79 |
| 2005/0248718 | A1* | 11/2005 | Howell | G02C 5/001 351/41 |
| 2005/0273914 | A1* | 12/2005 | Chiang | A63B 33/004 2/428 |
| 2006/0010585 | A1* | 1/2006 | Chiang | A63B 33/004 2/426 |
| 2006/0244897 | A1* | 11/2006 | Guenther | G02C 11/08 351/43 |
| 2007/0024806 | A1* | 2/2007 | Blanshay | A61F 9/026 351/62 |
| 2007/0118978 | A1* | 5/2007 | Chiang | A63B 33/004 2/426 |
| 2007/0277297 | A1* | 12/2007 | Chiang | A63B 33/004 2/426 |
| 2008/0111966 | A1* | 5/2008 | Chiang | A63B 33/004 351/43 |
| 2008/0127400 | A1* | 6/2008 | Dupuis | A42B 3/185 2/9 |
| 2008/0301857 | A1* | 12/2008 | Wang-Lee | A61F 9/026 2/431 |
| 2011/0037606 | A1* | 2/2011 | Boise | G02C 11/10 340/815.45 |
| 2011/0258761 | A1* | 10/2011 | Chou | A61F 9/02 2/452 |
| 2016/0070120 | A1* | 3/2016 | Cornelius | A61F 9/029 219/211 |
| 2020/0030150 | A1* | 1/2020 | Oduncu | A61F 9/00781 |
| 2021/0109380 | A1* | 4/2021 | Tsai | G02C 11/04 |
| 2021/0356771 | A1* | 11/2021 | Poteet | A61L 2/26 |
| 2024/0295757 | A1* | 9/2024 | Wise | G02C 11/04 |

* cited by examiner

ASSEMBLED PROTECTIVE GOGGLES WITH LIGHT

BACKGROUND OF THE INVENTION

1. Technical Field

The present invention relates to protective goggles, and more particularly to a pair of assembled protective goggles that provides lighting and has a replaceable secondary frame.

2. Description of Related Art

Generally, a pair of protective goggles for working or specific purposes has a lens frame and a face frame attached to the inner edge of the lens frame. The face frame further frames a cushion made of rubber or foam. When worn by a user, the goggles fit the user's face and encircle the user's eyes with the cushion to protect the eyes against foreign objects.

While the foregoing goggles provide protection as expected, since the lens frame and face frame are fixedly connected, the service life of the goggles is undesirably limited by the cushion that is subject to aging and/or wear.

Besides, most existing protective goggles are devoid of lighting functions. In occasions where lighting is necessary, users have to additionally prepare and arrange complementary lighting equipment.

To address the aforementioned shortcomings, there have been goggles equipped with side lamps for lighting. However, such side lamps, due to dimensional and directional limitations, usually have limited lighting coverage. In working scenarios require wide lighting coverage and/or precise lighting capability, these existing, incompetent goggles may adversely affect users' working efficiency and accuracy. Worse still, in working places with weak ambient light or for works requiring sustained attention, the insufficient lighting may degrade the users' working quality and undermine the users' ophthalmic health.

SUMMARY OF THE INVENTION

With the attempt to address the foregoing issues, the present invention provides assembled protective goggles with light.

In one embodiment of the present invention, the assembled protective goggles with light comprise: a primary frame, defining a primary inner side and a primary outer side that are reverse to each other, wherein the primary inner side is provided with two nose pads; two lenses, being installed at the side of the primary frame that has the two nose pads; two connecting members, being pivotally connected to two ends of the primary frame, respectively; a lighting unit, having a power source and a light source that are coupled to each other, wherein the power source is installed on one of the connecting members to power the light source, and the light source is installed on the primary outer side of the primary frame along a top edge of the primary frame; a wearable member, being connected to the two connecting members; and a secondary frame, being detachably connected to the primary frame.

With these configurations, when the secondary frame has been worn and become unusable after long use, instead of discarding the whole goggles, the user can easily renew the goggles by detaching the secondary frame from the primary frame and replacing it. This effectively extends the service life of the protective goggles, making use of the goggles more economic and sustainable.

With the light source arranged along the top edge of the primary frame, the assembled protective goggles with light of the present invention provides the area in front of the user with more complete and more uniform illumination as compared to the known goggles equipped with side lamps. This ensures competent lighting for users in various working scenarios and working environments.

DETAILED DESCRIPTION OF THE INVENTION

Figure 1:
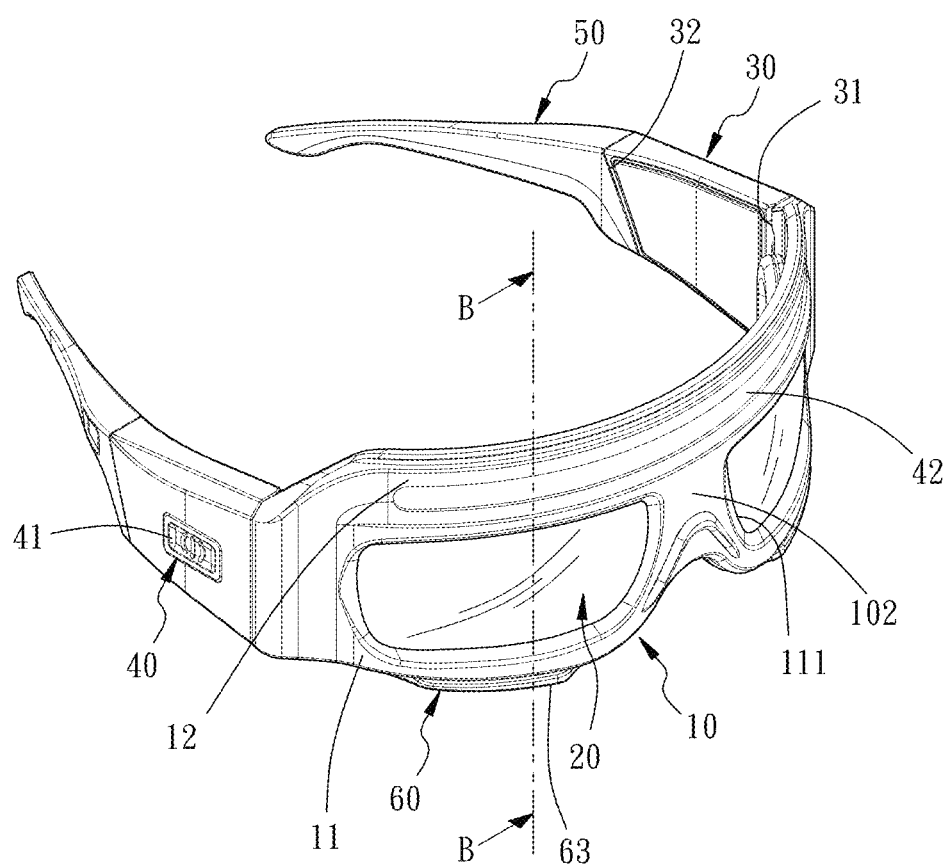
FIG. 1 is a perspective view of goggles according to a first embodiment of the present invention.

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives. However, the accompanying drawings are intended for reference and illustration, but not to limit the present invention and are not made to scale.

It is to be noted that spatial descriptions, such as "up," "down," "front," "back," "left," "right," "top," "bottom," "inside," "outside" and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

Referring to FIG. 1 through FIG. 11, the present invention provides assembled protective goggles with light 100. The goggles 100 are constructed from the following components.

A primary frame 10 defines a primary inner side 101 and a primary outer side 102 reverse to each other. The primary frame 10 has a frame portion 11 and an extension portion 12. The extension portion 12 extends upward from a top edge of the frame portion 11. The frame portion 11 is formed with two through sockets 111.

Figure 5:
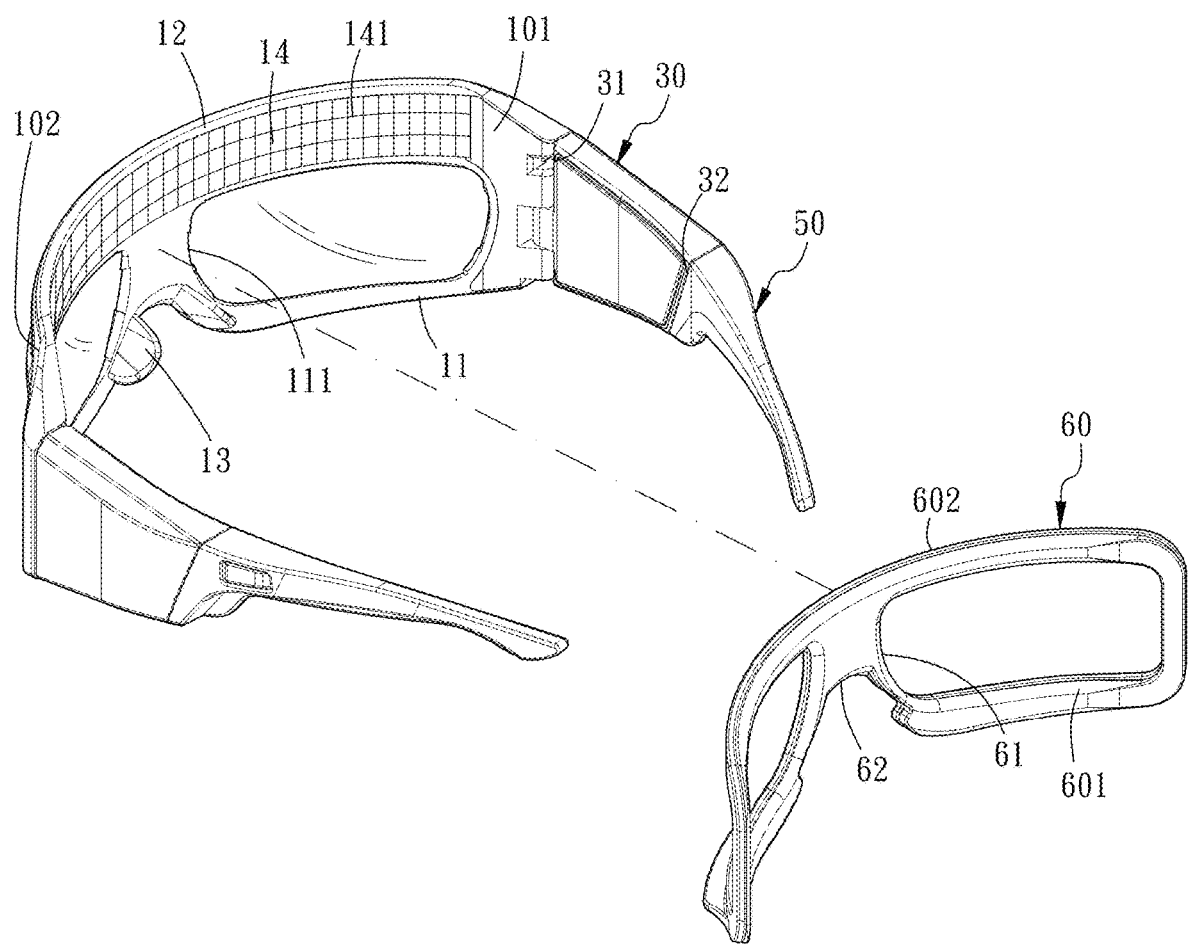
FIG. 5 is another exploded view of the goggles of FIG. 1.

Moreover, the primary frame 10 has two nose pads 13 formed at the primary inner side 101 in the frame portion 11. The two nose pads 13 are located between the two sockets 111, as shown in FIG. 5. The two nose pads 13 are configured to fit on two sides of the nasal bridge of a user wearing the goggles.

The primary frame 10 further has an anti-slip member 14 provided at the primary inner side 101 in the extension portion 12. The anti-slip member 14 is arranged adjacent to and extend along the top edge of the primary frame 10. The anti-slip member 14 is made of a foam material. In the embodiments of the present invention described herein, the anti-slip member 14 is formed with a plurality of anti-slip cells 141. The anti-slip cells 141 are arrayed.

Two lenses 20 are installed in the two sockets 111 of the primary frame 10. In the embodiments described herein, the two lenses 20 are clear. In other possible embodiments, the two lenses 20 may be colored or coated. For example, the lenses may be coated with anti-UV coating so that the assembled protective goggles with light 100 can be used as sunglasses.

Two connecting members 30 are pivotally connected to two ends of the primary frame 10. Each of the two connecting members 30 has a first connecting end 31 and a second connecting end 32 that are opposite to each other. The two connecting members 30 have their first connecting ends 31 pivotally connected to the primary frame 10. In the second embodiment, the second connecting end 32 of each of the connecting members 30 is formed with a strap hole 321, as shown in FIG. 7 through FIG. 10.

Figure 6:
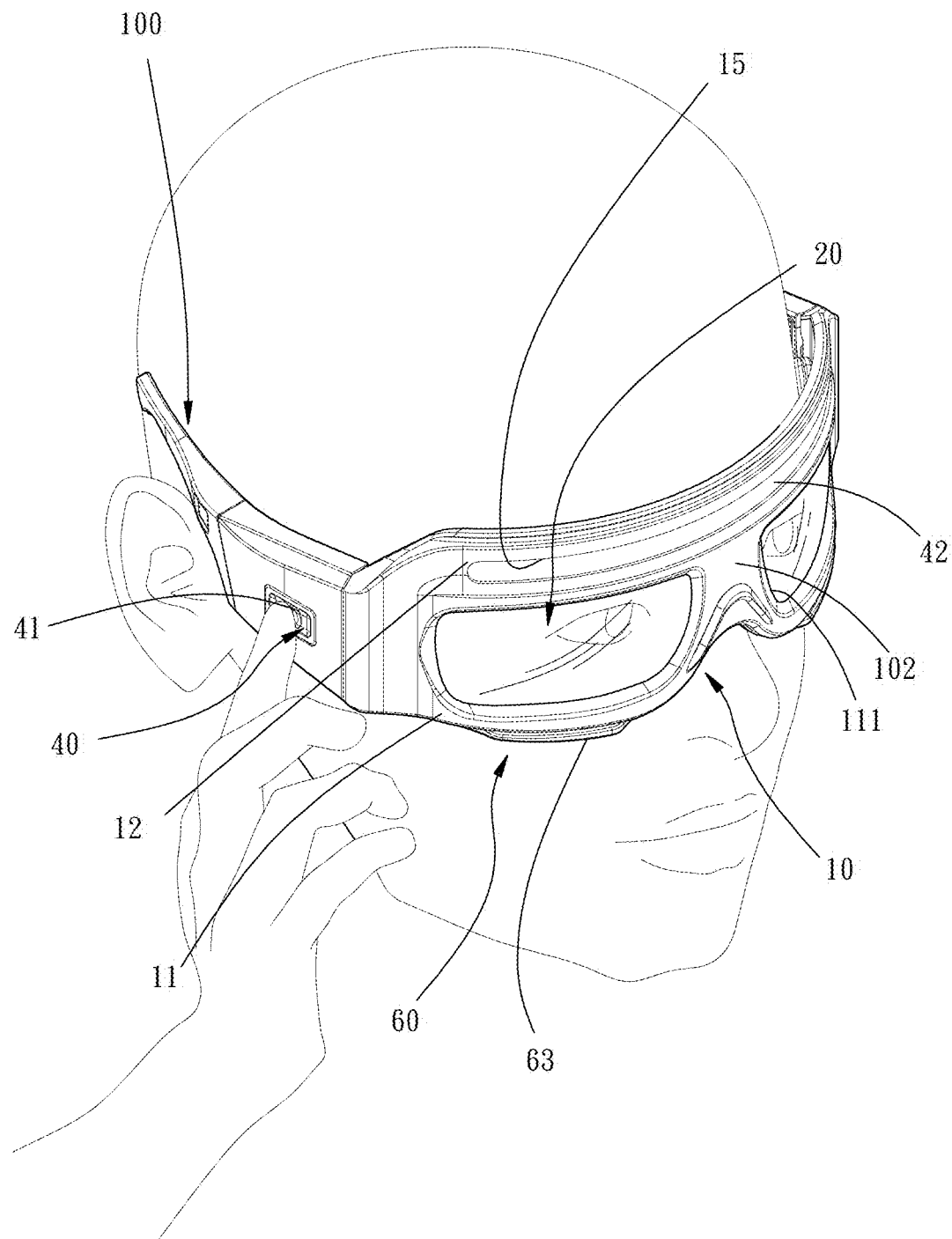
FIG. 6 is an applied view of the goggles of FIG. 1, showing that the goggles are worn by a user and providing lighting.
Figure 11:
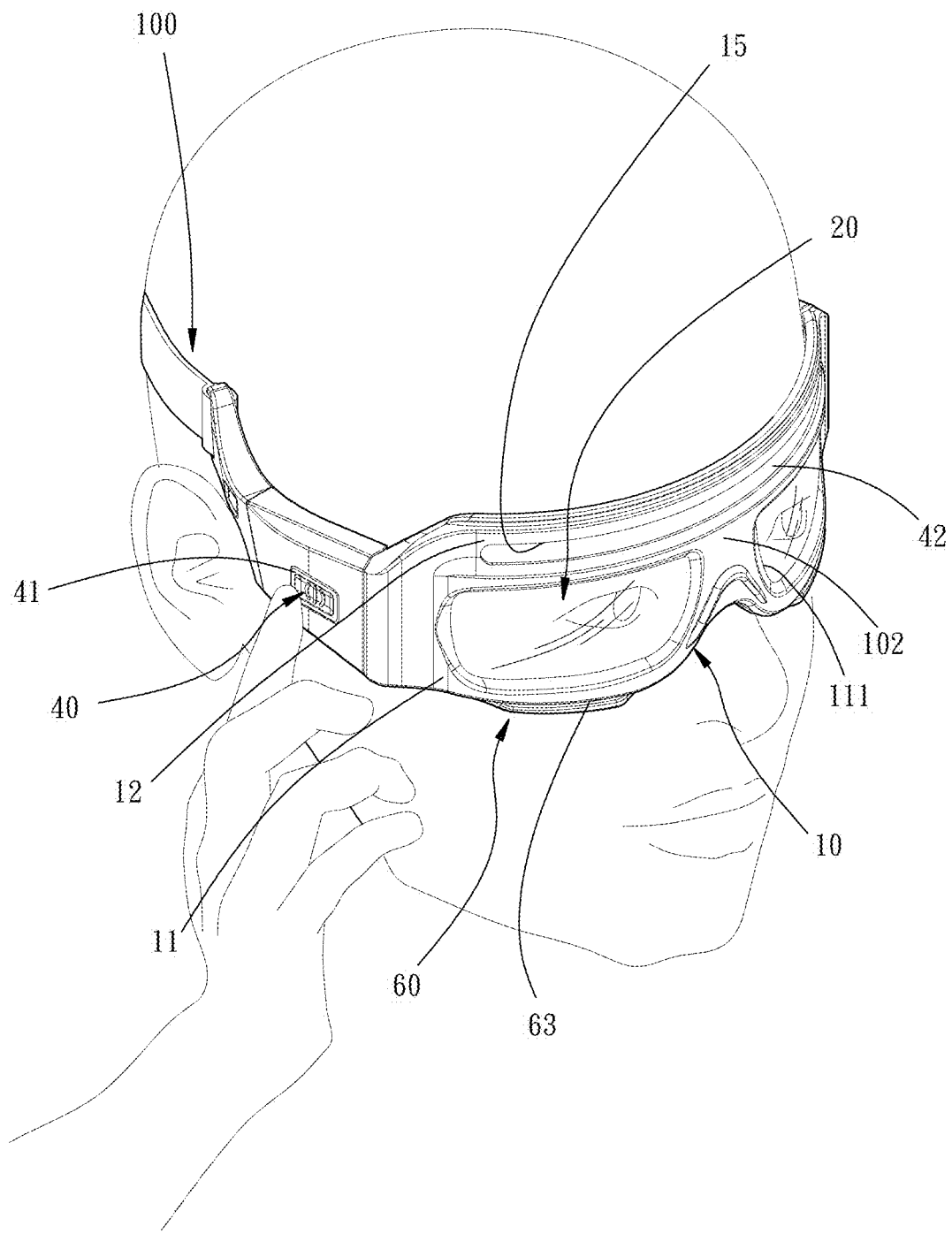
FIG. 11 is an applied view of the goggles of FIG. 7, showing that the goggles are worn by a user and providing lighting.

A lighting unit 40 has a power source 41 and a light source 42 that are coupled to each other. The power source 41 is installed on one of the connecting members 30. The light source 42 is installed at the primary outer side 102 in the extension portion 12 of on the primary frame 10. The light source 42 is arranged along the top edge of the primary frame 10. Therein, the power source 41 powers the light source 42 to emit light. In the embodiments described herein, the power source 41 has a switch and a battery (not shown), and the light source 42 is an LED lamp. When the switch is operated, the battery powers the light source 42, and the light source 42 emit light, as shown in FIG. 6 and FIG. 11.

Figure 2:
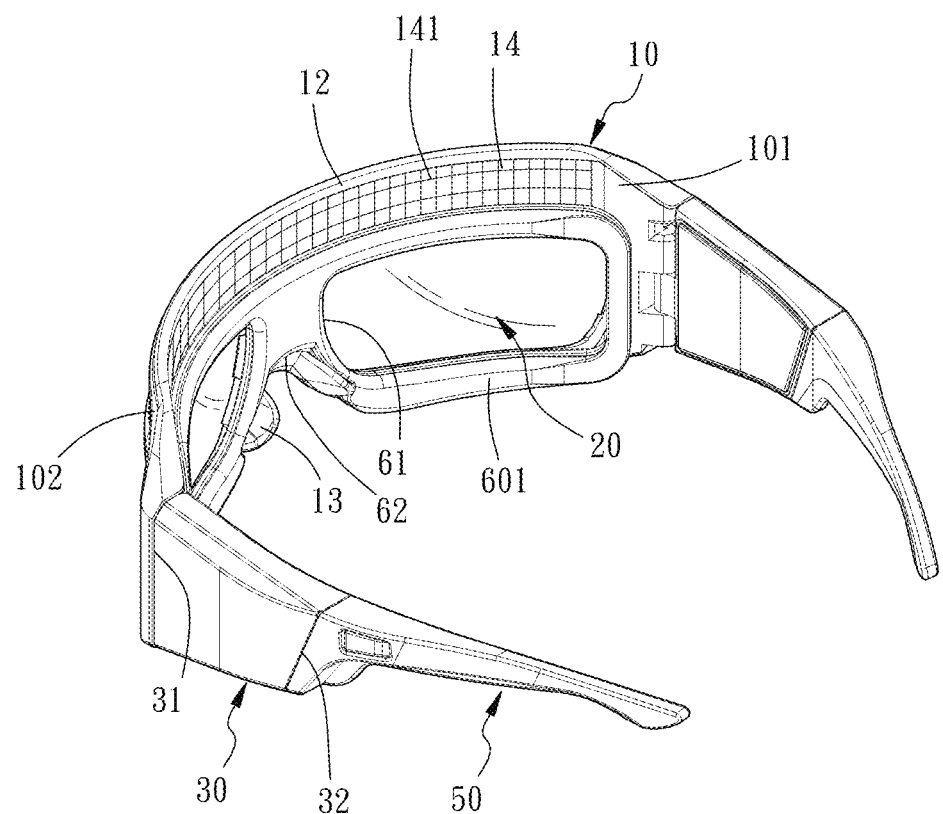
FIG. 2 is another perspective view of the goggles of FIG. 1.
Figure 7:
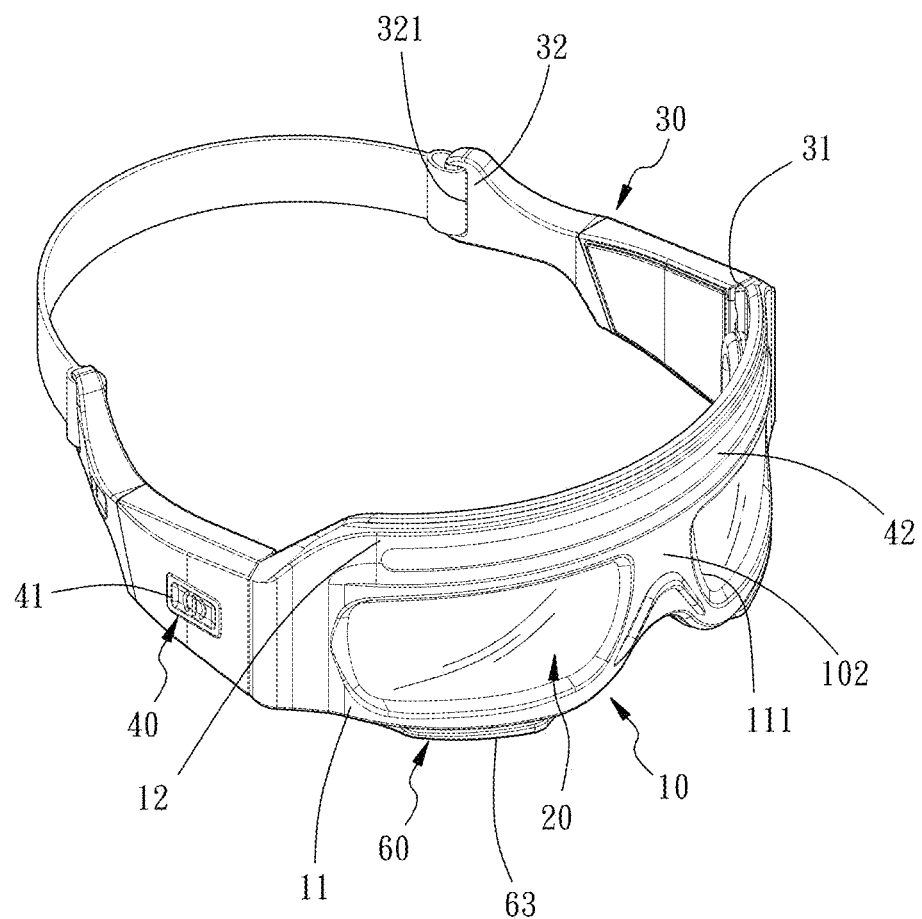
FIG. 7 is a perspective view of goggles according to a second embodiment of the present invention.
Figure 8:
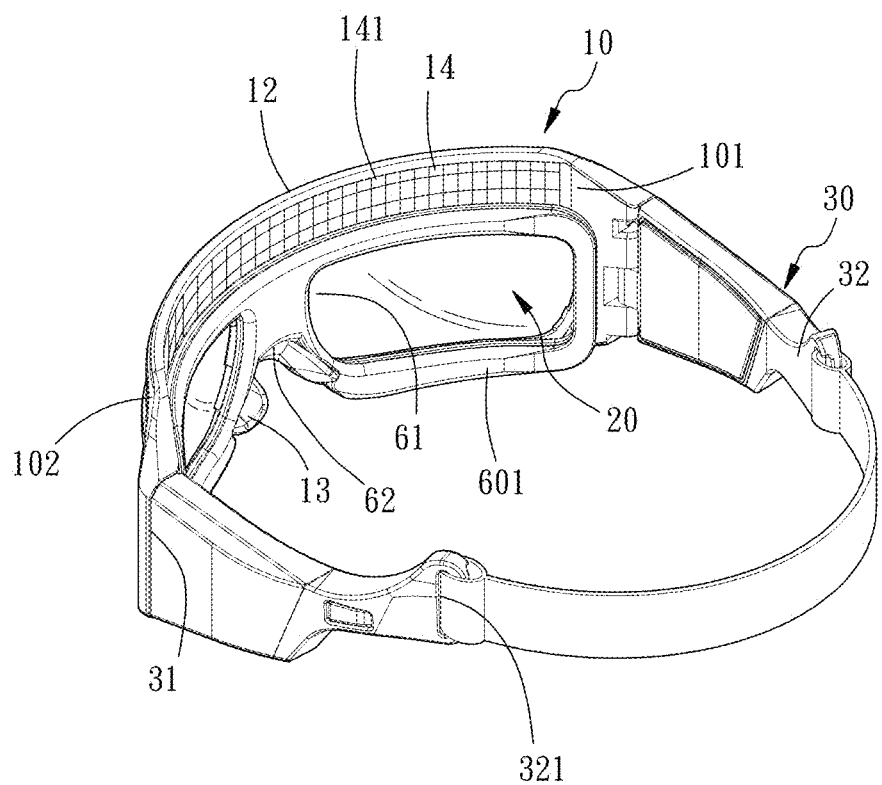
FIG. 8 is another perspective view of the goggles of FIG. 7.
Figure 9:
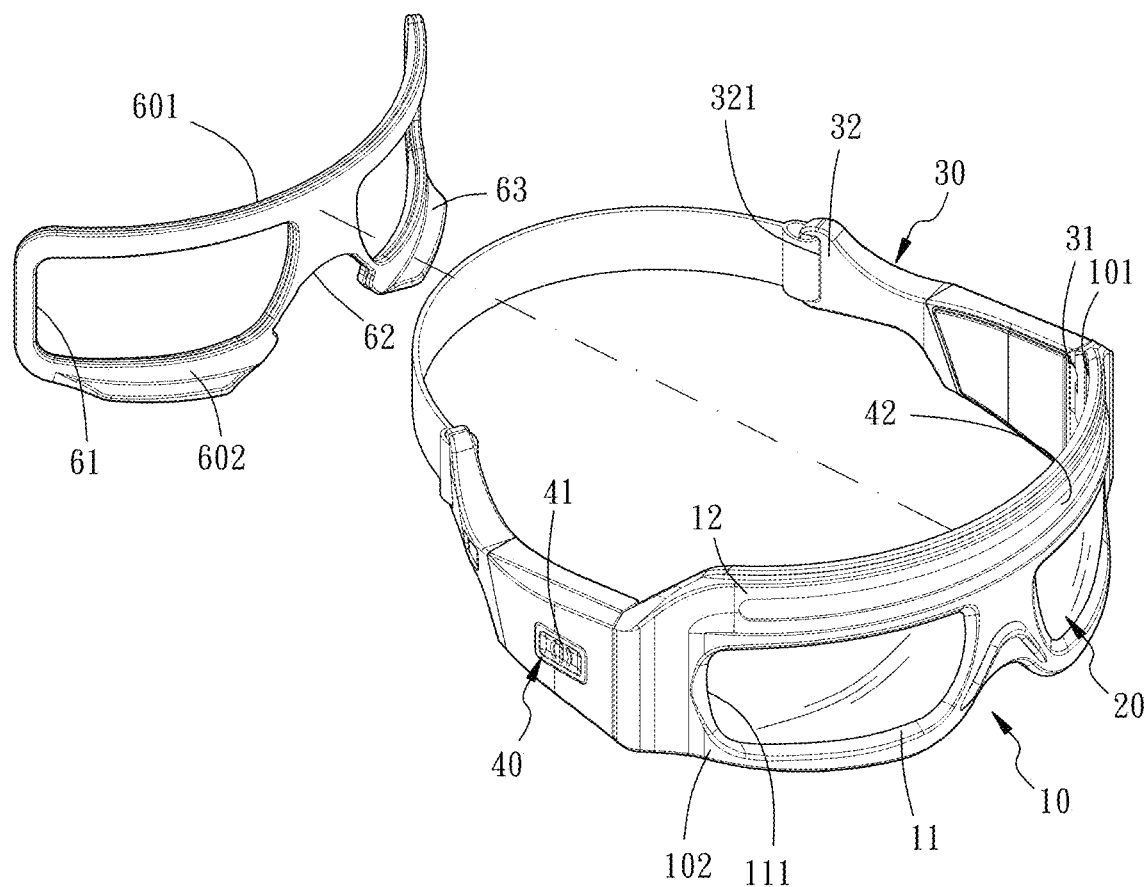
FIG. 9 is an exploded view of the goggles of FIG. 7.
Figure 10:
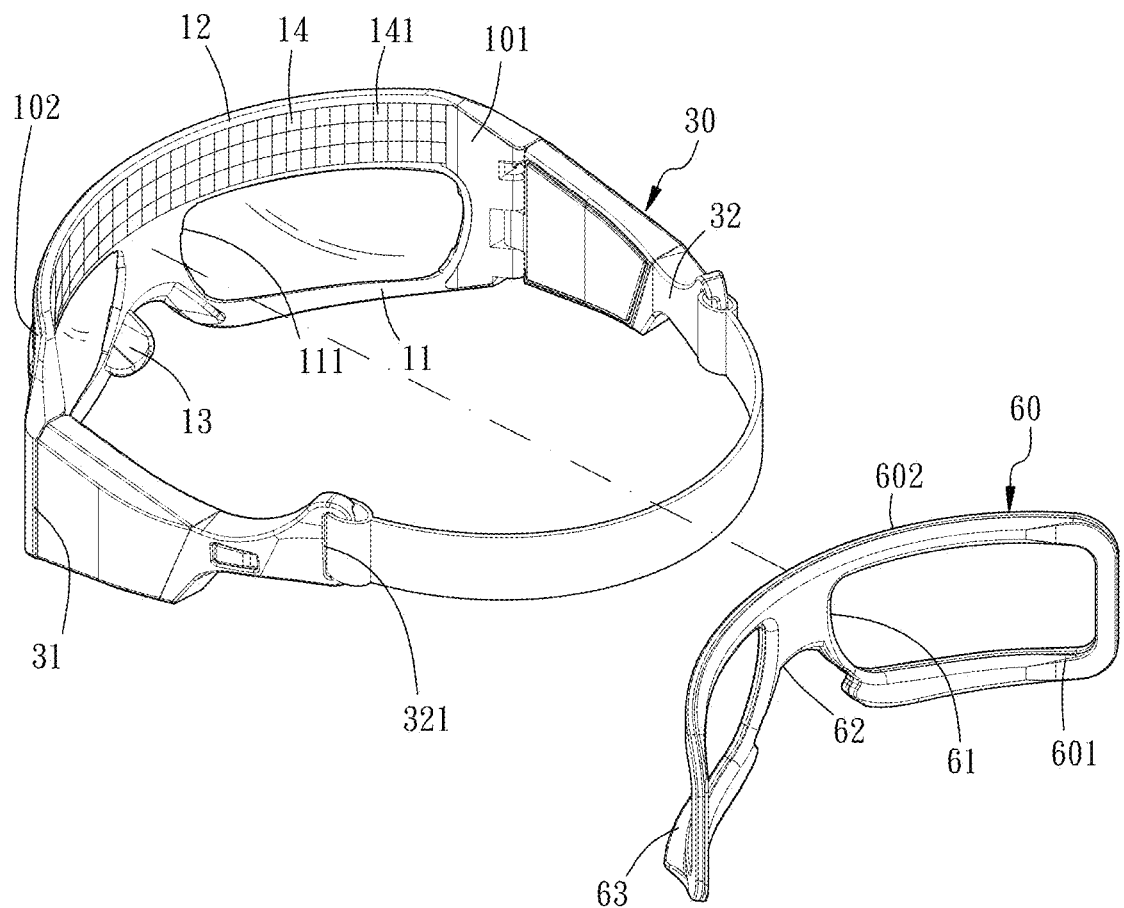
FIG. 10 is another exploded view of the goggles of FIG. 7.

A wearable member 50 is connected to the second connecting ends 32 of the two connecting members 30. In the first embodiment of the present invention, the wearable member 50 are two temples, as shown in FIG. 1 and FIG. 2. In the second embodiment of the present invention, the wearable member 50 is a strap with its two ends passing through and getting fixed at the two strap holes 321, as shown in FIG. 7 and FIG. 8.

A secondary frame 60 is detachably connected to the primary frame 10. In the embodiments described herein, the secondary frame 60 is sized and profiled to match the frame portion 11 of the primary frame 10. The secondary frame 60 is formed with two view windows 61. The two view windows 61 are corresponding to and aligned with the two sockets 111, as shown in FIG. 4, FIG. 5, FIG. 8, and FIG. 9.

The secondary frame 60 defines a secondary inner side 601 and a secondary outer side 602 that are reverse to each other. The secondary frame 60 has a fitting notch 62 is formed between the two view windows 61. When the secondary frame 60 is assembled to the primary frame 10, the fitting notch 62 of the secondary frame 60 fittingly receives the two nose pads 13 of the primary frame 10 so the secondary frame 60 is positioned with respect to the primary frame 10, as shown in FIG. 2, FIG. 4, and FIG. 5.

Figure 3:
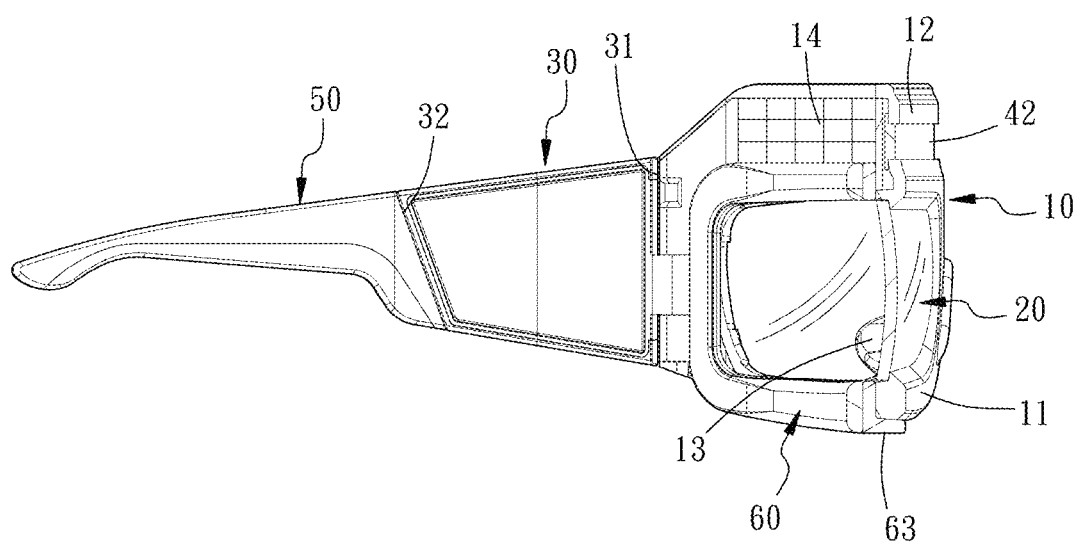
FIG. 3 is a cross-sectional view of the goggles taken along Line B-B in FIG. 1.
Figure 4:
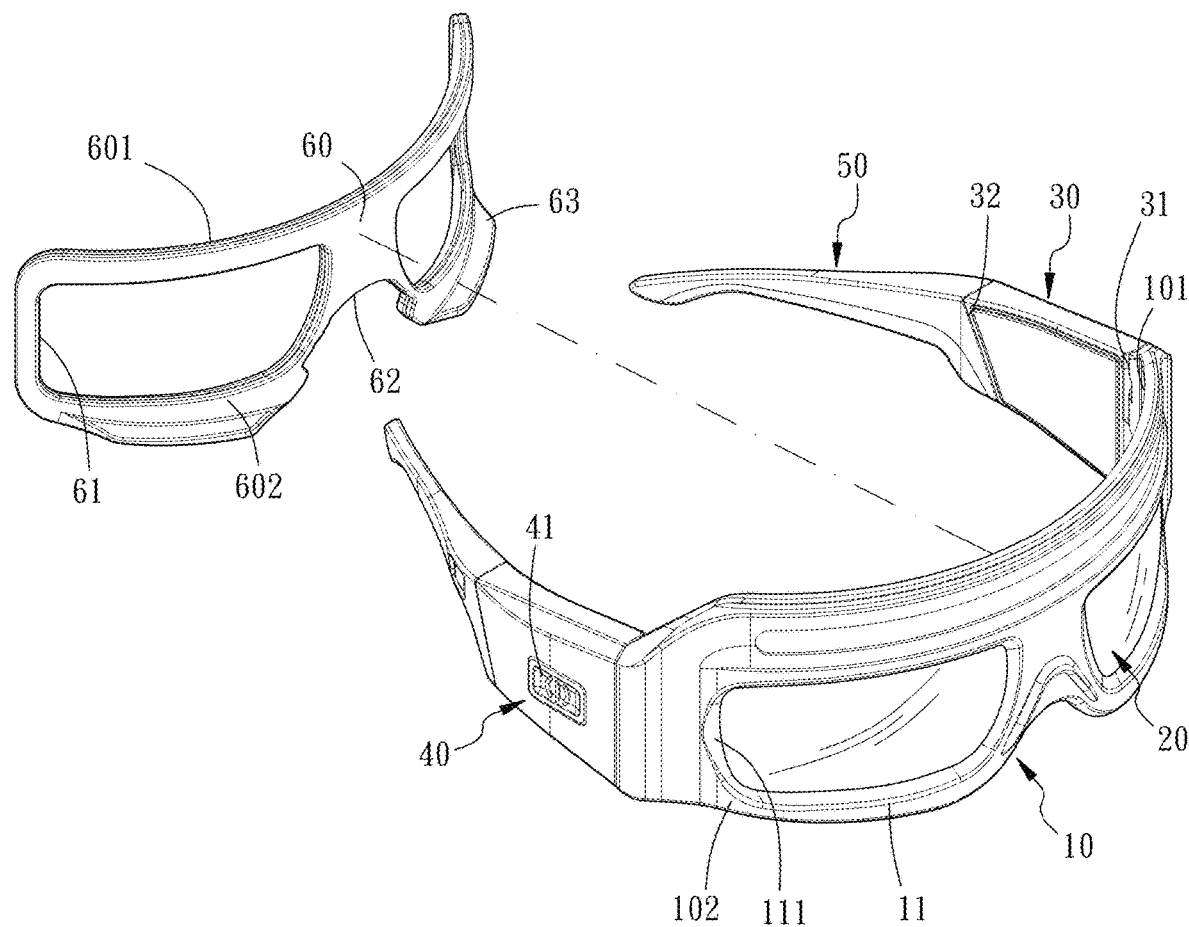
FIG. 4 is an exploded view of the goggles of FIG. 1.

Referring to FIG. 3 and FIG. 4, two fastening clips 63 are formed on the secondary outer side 602 of the secondary frame 60 along a bottom edge of the secondary frame 60. The two fastening clips 63 are located below the two view windows 61. When the secondary frame 60 is assembled to the primary frame 10, the two fastening clips 63 of the secondary frame 60 clip on a bottom edge of the primary frame 10.

Additionally, the secondary inner side 601 and the secondary outer side 602 of the secondary frame 60 may be made of different materials. For example, the secondary inner side 601 of the secondary frame 60 is made of a soft material and the secondary outer side 602 of the secondary frame 60 is made of rigid plastic. The secondary inner side 601 has a thickness greater than that of the secondary outer side 602.

Referring to FIG. 6 and FIG. 11, a user to wear the assembled protective goggles with light 100 may select the form of the wearable member 50, i.e., the temples or the strap, according to practical needs. When the goggles 100 are worn by the user, the two nose pads 13 of the primary frame 10 fit on the user's nasal bridge, and the extension portion 12 of the primary frame 10 abuts against the forehead of the user. The primary outer side 102 of the primary frame 10 faces outside, and the secondary inner side 601 of the secondary frame 60 fits on the user's face to encircle the eyes, thereby protecting the eyes from foreign objects. The user then can turn on the power source 41 that powers the lighting unit 40 to make the light source 42 cast light forward and illuminate the area in front of the user.

With these configurations, the present invention has the following effects:

1. When the soft material at the secondary inner side 601 of the secondary frame has been worn and become unusable after long use, instead of discarding the whole goggles, the user can easily renew the assembled protective goggles with light 100 of the present invention by detaching the secondary frame from the primary frame and replacing it. This effectively extends the service life of the protective goggles 100, making use of the goggles 100 more economic and sustainable.

2. With the light source 42 arranged along the top edge of the primary frame 10, the assembled protective goggles with light 100 of the present invention provides the area in front of the user with complete and uniform illumination. This ensures competent lighting for users in various working scenarios and working environments.

3. With the anti-slip member 14 abutting against the user's forehead, the anti-slip cells 141 increase friction between the user's skin and the primary frame 10, positioning the disclosed goggles 100 firmly and stably and prevent the goggles 100 from slipping off the user's face.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. Assembled protective goggles with light, comprising:
   a primary frame, defining a primary inner side and a primary outer side that are reverse to each other, wherein the primary inner side is provided with two nose pads, and the primary outer side of the primary frame is recessed to form a groove along a top edge of the primary frame;

two lenses, being installed at the side of the primary frame that has the two nose pads;

two connecting members, being pivotally connected to two ends of the primary frame, respectively;

a lighting unit, having a power source and a light source that are coupled to each other, wherein the power source is installed on one of the connecting members to power the light source to emit light, and the light source is installed in the groove on the primary outer side of the primary frame along the top edge of the primary frame;

a wearable member, being connected to the two connecting members; and a secondary frame, being detachably connected to the primary frame.

2. The assembled protective goggles with light of claim 1, wherein the primary frame has a frame portion and an extension portion, in which the frame portion is formed with two through sockets for holding the two lenses, and the two nose pads are located in the frame portion between the two sockets.

3. The assembled protective goggles with light of claim 2, wherein the extension portion extends outward from a top edge of the frame portion, and the light source is located in the extension portion.

4. The assembled protective goggles with light of claim 2, wherein the secondary frame defines a secondary inner side and a secondary outer side that are reverse to each other, and the secondary outer side of the secondary frame is provided with two fastening clips to clip on a bottom edge of the primary frame.

5. The assembled protective goggles with light of claim 4, wherein the secondary frame is formed with two view windows that match the two sockets and the two fastening clips correspond to the two view windows.

6. The assembled protective goggles with light of claim 5, further comprising a fitting notch formed between the two view windows of the secondary frame, wherein when the secondary frame is assembled to the primary frame, the fitting notch fittingly receives and thereby gets positioned with respect to the two nose pads.

7. The assembled protective goggles with light of claim 1, further comprising an anti-slip member such formed on the primary inner side of the primary frame that the anti-slip member is adjacent to and extends along the top edge of the primary frame.

8. The assembled protective goggles with light of claim 7, wherein the primary frame has a frame portion and an extension portion extending outward from a top edge of the frame portion, in which the frame portion is formed with two through sockets for holding the two lenses, and the two nose pads are located in the frame portion between the two sockets, and in which the light source and the anti-slip member are located in the extension portion.

9. The assembled protective goggles with light of claim 7, wherein the anti-slip member is made of a foam material.

10. The assembled protective goggles with light of claim 1, wherein the wearable member comprises two temples.

11. The assembled protective goggles with light of claim 1, wherein the wearable member comprises a strap, and the two connecting members each have a first connecting end and a second connecting end that are opposite to each other, in which the first connecting ends of the two connecting members are pivotally connected to the primary frame, and the second connecting ends of the two connecting members are each formed with a strap hole so that the two strap holes allow the two ends of the wearable member to pass therethrough and get fixed thereto.

12. The assembled protective goggles with light of claim 1, wherein the secondary frame defines a secondary inner side and a secondary outer side that are reverse to each other, and the secondary inner side and the secondary outer side are each made of a different material.

13. The assembled protective goggles with light of claim 12, wherein the material forming the secondary inner side of the secondary frame is a soft material, and the material forming the secondary outer side of the secondary frame is a rigid plastic material.

* * * * *